United States Patent [19]

Butseniex et al.

[11] 4,185,159

[45] Jan. 22, 1980

[54] METHOD FOR MELTING METALS IN A CHANNEL-TYPE INDUCTION FURNACE

[76] Inventors: Imant E. Butseniex, ulitsa Mira, 19, kv. 14, Rizhsky raion, Salaspils; Margarita Y. Levina, ulitsa Sormovskaya, 10, korpus 1, kv. 29; Alexandr A. Prostyakov, ulitsa Veshnyakovskaya, 35/26, kv. 66, both of Moscow; Mikhail Y. Stolov, ulitsa Volochaevskaya, 40 A, kv. 36, Moscow; Vladimir I. Sharamkin, ulitsa Mira, 16/7, kv. 313; Eduard V. Scherbinin, ulitsa Mira, 16/6, kv. 21, both of Rizhsky raion, Salaspils, all of U.S.S.R.

[21] Appl. No.: 745,997

[22] Filed: Nov. 30, 1976

[30] Foreign Application Priority Data

Dec. 8, 1975 [SU] U.S.S.R. ............................ 2196774

[51] Int. Cl.$^2$ ............................................. H05B 5/14
[52] U.S. Cl. ............................................................. 13/29
[58] Field of Search ................................. 13/26, 29, 27

[56] References Cited

U.S. PATENT DOCUMENTS 3,502,781  3/1970  Polischuk et al. .................. 13/29

Primary Examiner—Roy N. Envall, Jr.
Attorney, Agent, or Firm—Lackenbach, Lilling & Siegel

[57] ABSTRACT

A method is disclosed for melting metals in a channel-type induction furnace which has a double channel-type unit with two inductors, each inductor being located at a separate magnetic core. The method consists of variable magnetic fluxes, which induce electric current in the channels of the channel unit being generated in the cores and a through flow of metal along the channels being created. This flow is provided by reducing the hydrodynamic turbulence at the outlet of the central channel, the phase shift between the magnetic fluxes being maintained at an angle less than 90 electrical degrees. The rate of the metal flow is adjusted by changing the phase shift angle during the course of melting.

3 Claims, 4 Drawing Figures

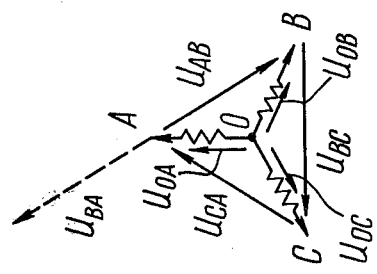
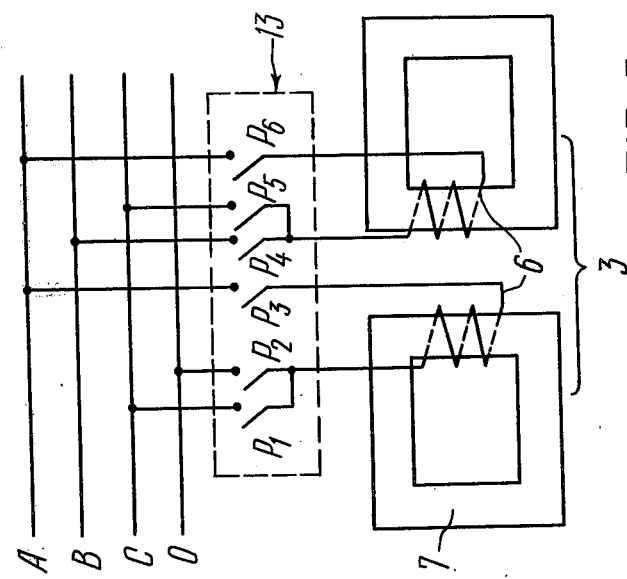
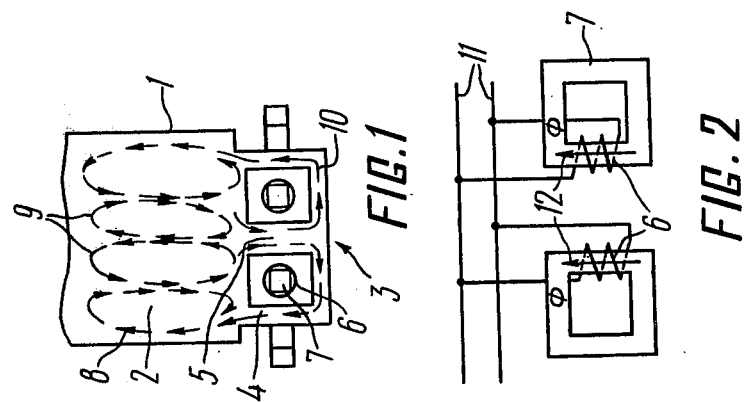
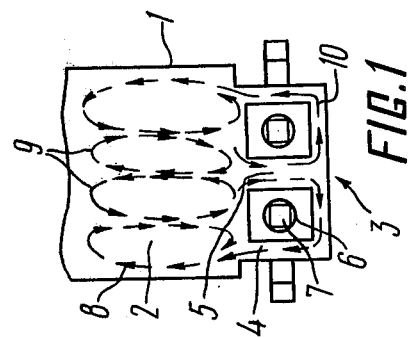
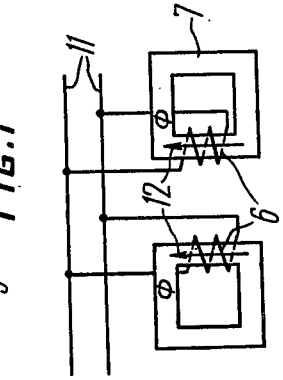

METHOD FOR MELTING METALS IN A CHANNEL-TYPE INDUCTION FURNACE

FIELD OF THE INVENTION

The present invention relates to methods for melting metals and, more particularly, to methods for melting metals in a channel-type induction furnace having a double inductor unit (i.e. two inductors located at separate magnetic cores).

The method of melting metals in a channel-type induction furnace consists of generating a variable magnetic flux in the core of the channel-type inductor unit, the flux transferring energy to the molten metal located in the channel. To, prevent the metal in the channel from overheating, the arising thermic energy must be effectively transferred to the furnace hearth where a charge of the metal to be melted is placed.

The method of melting, wherein a through flow of molten metal through a channel is created, makes it possible to sharply increase the speed of the transfer of thermic energy, produced in the channel, to the hearth and thus to reduce the overheating of the molten metal in the channel, to improve the operational conditions for the channels and the lining, and to increase the power and capacity of channel-type induction furnaces.

DESCRIPTION OF THE PRIOR ART

Known is a method for melting metals in a channel-type induction furnace with a single inductor unit, wherein a variable magnetic flux is generated in the core and a through flow of metal is created by shaping the channel, so that it gradually widens along its length or so that it is made with a non-circular cross section turning around along an axis perpendicular thereto.

However, the aforementioned melting methods provide an insufficient rate of metal flow and, therefore, they have not been widely used.

There is also known a method of melting metals in a channel-type induction furnace having two inductors located at separate magnetic cores (cf. U.S. Pat. No. 3,595,979 Cl. 13-29, issued 1971), wherein variable magnetic fluxes are generated in the cores and a through flow of metal from a central channel through lateral channels into the furnace hearth is created by the action of electromagnetic forces on the metal. The forces arise in the metal at the place of transfer of the central channel into the hearth (the channel outlet) because of the proper selection of the outlet profile.

Consider the aforesaid method in more detail. In double inductor units the curl of electromagnetic forces F at the outlets of the central and the lateral channels is not equal to zero (F=O), which is due to the induced electric current being spread over. Hydrodynamic turbulence flows (hereinafter referred to as turbulence) arise in these areas, the turbulence at the outlet of the central channel having the greatest velocity on the vertical axis thereof and moving upward along this axis into the hearth. As this turbulence is directed against the direction of metal circulation, the rate of the metal circulation is reduced, which results in unsteadiness of the flow. In the process of operating an inductor unit, the shape of the channels outlets changes because they are eroded or, conversely, narrowed by the metal being melted. As a result, negative action of turbulence at the outlet of the central channel can increase, which leads to a reduced rate of metal flow and, thus, overheating of the metal in the channel and premature failure of the inductor unit.

Moreover, the known method of melting does not allow the rate of the through flow of metal to be controlled, which is desirable in many case.

SUMMARY OF THE INVENTION

The main object of the present invention is to increase the rate of metal flow through the channels of a channel-type induction furnace having a double inductor unit.

Another object of the invention is to provide adjustment of this metal flow rate during the process of melting.

Still another object of the invention is to provide an improvement in the method for melting metals in a channel-type induction furnace, which may be performed without any complicated structure requirements.

These objects are accomplished by a method, for melting metals in a channel-type induction furnace with two inductors located at separate magnetic cores, comprising the steps of generating variable magnetic fluxes in the cores, the fluxes inducing electric current in the channels, and creating a through flow of metal through the channels. The flow is created, according to the invention, by the hydrodynamic turbulence at the outlet of the central channel, the phase shift between the magnetic fluxes being maintained at an angle less than 90 electrical degrees.

It is preferable to maintain the phase shift angle at zero degrees.

The phase shift angle may be changed during the process of melting so as to be reduced to increase the rate of the metal flow through the channels and to be increased to reduce this metal flow rate.

The use of the herein proposed method for melting metals in a channel-type induction furnace with a double inductor unit makes it possible, as compared with the known methods, to increase the rate of the metal flow through the channels without making the shape of the channels more complicated, to prolong the service life of the lining in the inductor units, to control the rate of metal flow during melting, and to maintain this rate at the required level in operation.

BRIEF DESCRIPTION OF THE DRAWINGS

Some exemplary embodiments of the invention will now be described with reference to the accompanying drawings, in which:

FIG. 1 is a schematic longitudinal sectional view of the channel-type induction furnace according to the invention;

FIG. 2 is an electrical circuit diagram showing the connection of the inductors to a current supply source at a zero phase shift, according to the invention;

FIG. 3 is an electrical circuit diagram showing the connection of the inductors to a current supply source at an adjustable phase lag, according to the invention; and FIG. 4 is a voltage diagram for a three-phase circuit.

DETAILED DESCRIPTION OF THE INVENTION

Referring now to the drawings, there is shown in FIG. 1 a channel-type induction furnace which comprises a hearth 1 filled with a metal 2 to be melted and coupled to a double channel-type inductor unit 3. The unit 3 consists of two side or lateral channels 4, one central channel 5, and two inductors 6 located around separate magnetic cores 7. Arrows 8 and 9 designate the hydrodynamic turbulence at the respective outlets of the side channels 4 and the central channel 5, and arrows 10 show the unidirectional flow of metal along the channels 4 and 5 within the inductor unit 3.

FIG. 2 is a circuit diagram for the connection of the inductors 6 to bus-bars 11 of a single-phase alternating current supply source. Arrows 12 show the direction of magnetic flux $\phi$ in the cores 7.

FIG. 3 is a circuit diagram for the connection of the inductors 6 to bus-bars A, B, C, and O of a three-phase alternating current supply source. Unlike the circuit represented in FIG. 2, the circuit show in FIG. 3 incorporates a unit 13 to adjust the phase shift of the magnetic fluxes in the cores 7, the unit 13 being connected between the inductor unit 3 and the three-phase circuit. In the described embodiment of the circuit, the unit 13 comprises a set of knife switches $P_1$, $P_2$, $P_3$, $P_4$, $P_5$ and $P_6$ to adjust the phase shift in steps of 0°, 30°, and 60°. Other embodiments of the unit 13, which are not shown in the drawings, are also possible. These may incorporate, for instance, induction phase regulators.

FIG. 4 is a diagram of the voltages $U_{OA}$, $U_{OB}$, $U_{OC}$, $U_{AB}$, $U_{BC}$, $U_{CA}$, and $U_{BA}$ in the three-phase circuit.

The herein proposed method of melting metals in a channel-type induction furnace with a double inductor unit 3 (see FIG. 1) is effected so that the magnetic fluxes inducing electric current in the metal located in the channels 4 and 5 of the inductor unit 3 are generated in the magnetic cores 7. During the generation of the fluxes, the hydrodynamic turbulence shown in FIG. 1 by the arrows 9 and 8 arises at the outlets of the channels 4 and 5. When the inductors 6 are connected to the single-phase circuit shown in FIG. 2, which provides a zero phase shift angle to the magnetic fluxes, there is no turbulence at the outlet of the central channel 5, and the metal forced by the turbulence out of the side channels 4 (arrows 8) enters the central channel 5, thus ensuring a unidirectional circulation of the metal through the channels 4 and 5 at a maximum rate in the direction denoted by the arrow 10.

When the metal flow rate needs to be adjusted during the course of melting, the inductors 6 should be connected to a three-phase alternating current supply circuit in accordance with the circuit diagram shown in FIG. 3. Here, as the knife switches $P_1$, $P_3$, $P_5$, and $P_6$ are actuated, the voltage $U_{CA}$ is applied to the inductors 6, i.e. the phase shift equals zero, and metal circulates at a maximum rate. On actuating the switches $P_1$, $P_3$, $P_4$, and $P_6$, the voltages $U_{CA}$ and $U_{BA}$ with a phase angle of 60° therebetween (FIG. 4) are applied to the inductors 6; here the rate of the metal flow is substantially lower. On actuating the knife switches $P_2$, $P_3$, $P_4$, and $P_6$, the voltages $U_{OA}$ and $U_{BA}$ with a phase shift angle of 30° therebetween are applied to the inductors 6 as shown in FIG. 4; the metal flow rate is higher than that in the previous case, but lower than that in the case of the zero phase shift.

For studying the circulation of the molten metal with the two metal melting methods, viz., those known in the prior art and proposed in the present invention, experiments were carried out with mercury using a laboratory model of a channel-type induction furnace with a double inductor unit. In testing the method, according to the invention, the phase angle between the magnetic fluxes was maintained at the zero value. The experiments have shown that the method of the invention provides more stable circulation of metal through the channels and a rate of flow 4–5 times higher for equal power of the inductor unit.

What is claimed is:

1. A method for melting metals in a channel-type induction furnace having a hearth coupled to a double channel-type unit provided with two inductors, each inductor being located at a separate magnetic core, comprising the steps of generating variable magnetic fluxes in said cores, the phase shift angle between said magnetic fluxes being less than 90 electrical degrees; and creating a through flow of metal along the channels of said channel-type unit by reducing hydrodynamic turbulence at the outlet of a central channel.

2. A method for melting metals as claimed in claim 1, wherein said phase shift angle is maintained at zero degrees.

3. A method for melting metals as claimed in claim 1, wherein said phase angle is variable during the process of melting, a reduction of the phase shift angle causing an increase in the rate of the metal flow through said channels and an increase of the phase shift angle causing a reduction in the rate of the metal flow through said channels.

* * * * *